June 11, 1940.    S. MENDELSOHN    2,204,424
PHOTOFLASH SYNCHRONIZER
Filed Sept. 21, 1936    3 Sheets-Sheet 1
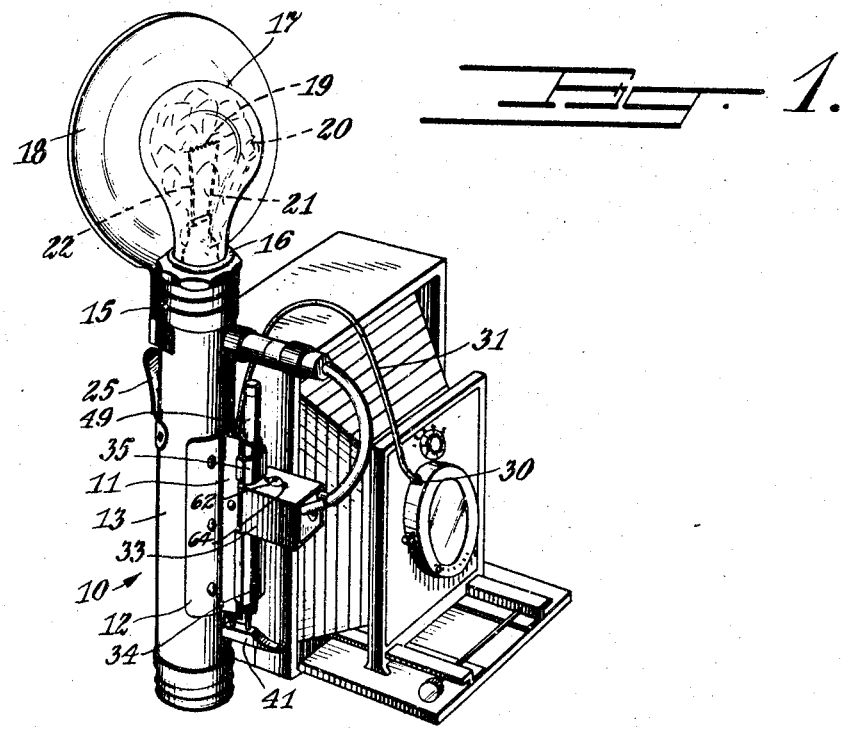
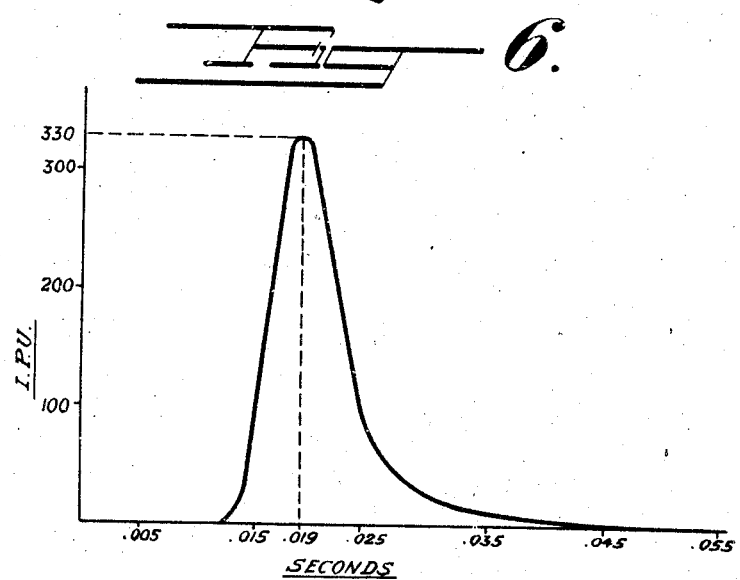
INVENTOR.
S. MENDELSOHN
BY
ATTORNEY.

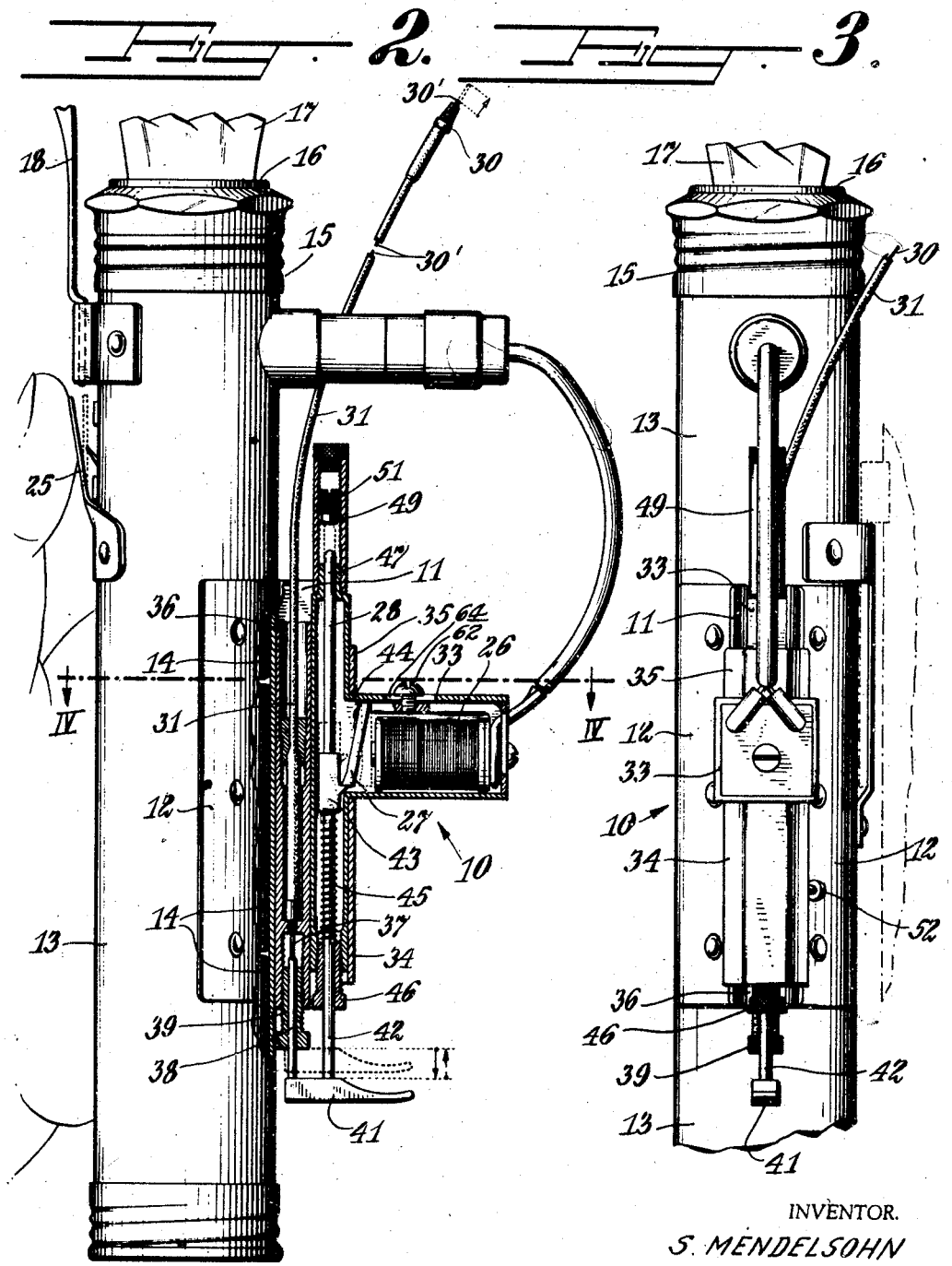

June 11, 1940.  S. MENDELSOHN  2,204,424
PHOTOFLASH SYNCHRONIZER
Filed Sept. 21, 1936   3 Sheets-Sheet 3
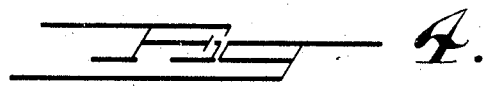
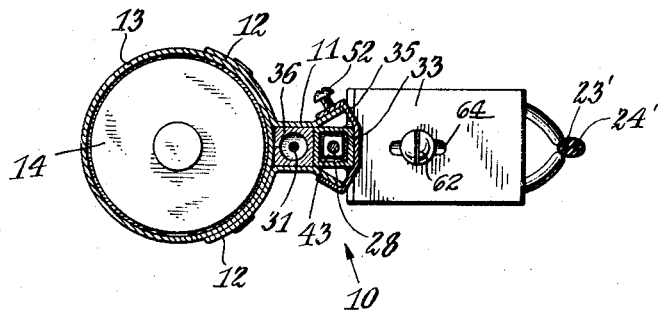
INVENTOR.
S. MENDELSOHN
BY
ATTORNEY.

Patented June 11, 1940

2,204,424

UNITED STATES PATENT OFFICE 2,204,424

PHOTOFLASH SYNCHRONIZER

Samuel Mendelsohn, Brooklyn, N. Y.

Application September 21, 1936, Serial No. 101,782

8 Claims. (Cl. 67—29)

This invention relates to a device for use with photographic apparatus for the purpose of synchronizing the flash produced by a photoflash bulb with the operation of a camera shutter.

Devices for the above purpose must not only be positive in operation and capable of repeated and continuous use, but they must be simple in structure and the operating elements so coordinated and arranged that the device may be conveniently handled to serve without being cumbersome as part of a photographic equipment.

It is an object of the present invention to provide a device for operating a camera shutter and a photoflash lamp simultaneously.

Another object of the invention is to provide means for causing an instantaneous actuation of a cable release to actuate a camera shutter and to operate a photoflash lamp.

Another object of the invention is to provide a device attachable to a camera so arranged and constructed that upon the operation of a switch to light a photoflash lamp a simultaneous operation of the camera shutter is effected.

Another object of the invention is to provide a device in which means are provided to store sufficient potential energy to operate a cable release and to release said energy by means effecting an operation of a photoflash lamp.

Another object of the invention is to provide a combined mechanical and electrical device in which electrical energy operates to release mechanical energy to cause the simultaneous or synchronized operation of a photoflash lamp and a camera shutter.

Other objects and advantages of the invention will be more clearly understood by reference to the following description together with the accompanying drawings in which, Fig. 1 is a perspective view of a device constructed in accordance with my invention applied to a camera;

Fig. 2 is an enlarged side view of my device partly broken away to more clearly show certain movable parts;

Fig. 3 is a view taken on the right hand side of the device shown in Fig. 1;

Fig. 4 is a view taken on line IV—IV in Fig. 2;

Fig. 5 is a schematic view of the electrical circuit and spring actuated elements of the present device, and Fig. 6 is a curve showing the peak of light illumination in I. P. U. (international photographic units) and the duration in fractions of seconds.

Although the present camera shutter operating device may be supported in any suitable manner one practical embodiment is shown wherein the shutter operating mechanism actuates what is termed a cable release which in turn actuates a camera shutter.

The said mechanism which is indicated as a whole by the numeral 10 is contained in a support 11 having flanges 12 secured to a battery casing 13 containing the usual dry cell batteries 14. At one end 15 of the casing is a socket 16 to receive the base of a photoflash lamp 17 of the usual commercial type. A reflector 18 may be provided at one side of the lamp. The lamp 17 is provided with a heater element or primer 19 around which is disposed loosely packed aluminum foil 20. The heater element is provided with leads 21 and 22 which are connected in the usual manner to the metallic shell of the base and to a central contact thereof. The shell of the base is electrically connected to a conductor 23 with one side of the battery 14 (see Fig. 5). The central contact is connected by conductor 24 to the other side of the battery. A switch 25 is provided for purposes to be later described. Conductor 23′ leads from the shell of the base to one end of the coil of a solenoid 26 and conductor 24′ leads from the central contact of the base to the other end of the coil of the solenoid. Thus when the switch 25 is closed current flows through the heater element 19 and through the solenoid 26 to energize the same and operates an armature 27. The armature serves to release a plunger 28 to actuate a cable release which in turn actuates a camera shutter arm 29 through the movement of a cable release 30 in the form of a flexible wire 30′ in a casing 31.

The mechanism for operating the cable release includes the support 11 which carries a housing 33 for the plunger 28 and the solenoid 26. This housing is held in the support 11 and retained by cross-pieces or slide clamps 34 and 35.

These clamps may be fitted tightly or may be held by set screws and being adjustable along the support it is possible to adjust the housing 33 relative to the support for purposes to be presently described.

Between the housing 33 and the battery casing and inclosed by the support 11 is a socket or retainer member 36 for the cable release 30. As above pointed out the cable release includes a sheath or casing 31 which is anchored in the member 36 and one end 37 of the flexible wire 30′ of the cable release is attached to one end of a push rod 38 in an adjustable bearing 39. The other end of the push rod is secured to a finger piece 41 which bridges the push rod and the lower end 42 of the plunger 28 to which the finger piece is also secured, thus a movement of the finger piece 41 results in a simultaneous movement of both the push rod and plunger.

The plunger 28 is provided with a latch member 43 to engage the armature 27 which latter is normally urged toward the latch by a spring 44. A helical spring 45 disposed between the latch member and an adjustable bearing 46 serves to provide energy to actuate the plunger 28 and consequently the cable release.

The upper end 47 of the plunger extends into a cap 49 in which is disposed an adjustable stop 51 to limit the upward movement of the plunger 28. The bearing 39 is in the form of a threaded member whereby an additional adjustment is had to control the degree of movement of the cable release.

In operation a lamp is inserted in the socket, the switch 25 being open no current flows through the bulb or solenoid. The finger piece is depressed until the latch member 43 is engaged by the armature 27, thus the cable release is in position ready to operate, the shutter having been set and the lever arm 29 disposed in position to be actuated by the cable release.

The switch 25 is then closed to cause current to flow in the circuit. The coil of the solenoid and the lamp being in parallel the current heats up the igniter of the lamp during the time the coil of the solenoid becomes energized to cause the armature to move so that the potential energy in the spring is released to operate the camera shutter at the peak of the flash and as shown in the graph Fig. 6 it takes .019 of a second to reach the peak for the highest I. P. U. output.

In my Patent No. 1,986,513 issued January 1, 1935, a device is shown which preheats the filament to avoid the lag between the time the circuit is closed and the time of the actual flash. In the present device the preheating is omitted and advantage is taken of the lag which gives a time interval during which the mechanical elements operate to trip the shutter.

As will be noted the cable release is adjustable since the operating mechanism is slidable in the support 11. A set screw 52 holds the housing 33 by reason of the clamps 34 and 35. When the set screw 52 is loosened the clamps slide to permit the housing 33 to be adjusted which causes the wire 30' to be either retracted or projected so that the exact degree of impact on the lever of the shutter may be attained.

The stop 51 and stop 39 serve to provide a fine degree of adjustment in limiting the movement of the plunger 28 in timed relation to the peak of the flash. With the adjustment provided the device may be readily set to operate a shutter with any make of photoflash bulb.

The present invention provides a device which may be readily adjusted to a camera and by reason of its simplicity and positiveness of operation provides a device of great advantage particularly for news photographers where quick action and sure results are essential. The present circuit as above pointed out serves to release stored energy and at the same time flash a lamp.

The solenoid armature may be adjusted by varying the tension of the spring 44 to hasten or delay the action of the armature to give a time factor in the operation of the device so that it can be initially set for a given type of photoflash lamp having certain characteristics, or adjusted for another type lamp of different characteristics as the necessity arises. Although this adjustment may be effected in various ways, the selected embodiment shows the solenoid 26 secured to the housing 33 by a screw 62 (Figs. 1 and 2) which passes through an enlarged hole or slot 64. It is, therefore, only necessary in the present structure to loosen the screw 62 and slide the solenoid along the housing in the direction of the armature or trigger member 27. Since the latter bears against the latch member 43 which acts as a stop for the armature 27, the air gap between the latter and the armature core is decreased and the tension of the spring 44 thus increased thereby altering the time factor in the operation of the device.

I claim:

1. A device for operating a photoflash lamp and a camera shutter simultaneously, comprising a shutter actuating member, means for storing potential energy upon a movement of said member, a solenoid having an armature arranged to constitute a trigger member for holding said shutter actuating member ready for actuation, means for adjusting said trigger member for varying the time factor of operation of said device, means for supporting a photoflash lamp, a solenoid circuit, a photoflash lamp circuit in parallel with said solenoid circuit, and means for causing a flow of electrical energy through said circuits to flash said lamp and move said trigger within a predetermined time period following initial flow of energy in said circuits to release said shutter actuating member at substantially the peak of the flash.

2. A device for operating a photoflash lamp and a camera shutter simultaneously comprising a shutter actuating member, means for storing potential energy upon a movement of said member, a solenoid having an armature arranged to constitute a trigger member for holding said shutter actuating member ready for actuation, means for adjusting said trigger member for varying the time factor of operation of said device, means for supporting a photoflash lamp, a solenoid circuit, a photoflash lamp circuit in parallel with said solenoid circuit and means for causing a flow of electrical energy through said circuits to flash said lamp and move said trigger within a predetermined time period following initial flow of energy in said circuits to release said shutter actuating member at substantially the peak of the flash, and means for adjusting the degree of forward movement of said shutter actuating member.

3. A device for operating a photoflash lamp and a shutter simultaneously comprising a shutter actuating member, a spring, means carried by said member for compressing said spring upon a movement of said member, a solenoid having an armature constituting a trigger to hold said member ready for actuation under the expansive force of said spring, means for adjusting said trigger member for varying the time factor of operation of said device, means for supporting a photoflash lamp, a solenoid circuit, a photoflash lamp circuit in parallel with said solenoid circuit, and means for causing a flow of electrical energy through said circuits to flash said lamp and actuate said trigger within a predetermined period of time following initial flow of energy in said circuits to release said shutter actuating member at substantially the peak of the flash.

4. A device for operating a photoflash lamp and a camera shutter simultaneously comprising a shutter actuating member, a spring, means carried by said member for compressing said spring upon retraction of said member, a solenoid having an armature constituting a trigger to hold said member ready for actuation under the expansive force of said spring, means for adjusting said trigger member for varying the time factor of operation of said device, means for supporting a photoflash lamp, a solenoid circuit, a photoflash lamp circuit in parallel with said solenoid circuit, and means for causing a flow of electrical energy through said circuits to flash said lamp and actuate said trigger within a predetermined period of time following initial flow of energy in said circuits to release said shutter actuating member at substantially the peak of the flash and means for varying the degree of movement of said shutter actuating member.

5. A device for operating a photoflash lamp and a camera shutter simultaneously, comprising a shutter actuating member, means for storing potential energy upon a movement of said member, a flexible member having one end connected to said shutter actuating member and the other end positioned to engage a camera shutter arm, a solenoid having an armature arranged to constitute a trigger member for holding said shutter actuating member ready for actuation, means for adjusting said trigger member for varying the time factor of operation of said device, means for supporting a photoflash lamp, a solenoid circuit, a photoflash lamp circuit in parallel with said solenoid circuit and means for causing a flow of electrical energy through said circuits to flash said lamp and move said trigger within a predetermined period of time following initial flow of energy in said circuits to release said shutter actuating member at substantially the peak of the flash.

6. A device for operating a photoflash lamp and a camera shutter simultaneously comprising a shutter actuating member, means for storing potential energy upon a movement of said member, a flexible member having one end connected to said shutter actuating member and the other end positioned to engage a camera shutter arm, a solenoid having an armature arranged to constitute a trigger member for holding said shutter actuating member ready for actuation, means for adjusting said trigger member for varying the time factor of operation of said device, means for supporting a photoflash lamp, a solenoid circuit, a photoflash lamp circuit in parallel with said solenoid circuit and means for causing a flow of electrical energy through said circuits to flash said lamp and move said trigger within a predetermined period of time following initial flow of energy in said circuits to release said shutter actuating member at substantially the peak of the flash and means for adjusting the degree of forward movement of said shutter actuating member.

7. A device for operating a photoflash lamp and a camera shutter simultaneously comprising a shutter actuating member, a spring, means carried by said member for compressing said spring upon movement of said member, a flexible member having one end connected to said shutter actuating member and the other end positioned to engage a camera shutter arm, a solenoid having an armature constituting a trigger to hold said member against expansive force of said spring ready for actuation, means for adjusting said trigger member for varying the time factor of operation of said device, means for supporting a photoflash lamp, a solenoid circuit, a photoflash lamp circuit in parallel with said solenoid circuit, and means for causing a flow of electrical energy through said circuits to flash said lamp and actuate said trigger within a predetermined time period following initial flow of energy in said circuits to release said shutter actuating member at substantially the peak of the flash.

8. A device for operating a photoflash lamp and a camera shutter simultaneously comprising a shutter actuating member, a spring, means carried by said member for compressing said spring upon movement of said member, a flexible member having one end connected to said shutter actuating member and the other end positioned to engage a camera shutter arm, a solenoid having an armature constituting a trigger to hold said member against expansive force of said spring, ready for actuation, means for adjusting said trigger member for varying the time factor of operation of said device, means for supporting a photoflash lamp, a solenoid circuit, a photoflash lamp circuit in parallel with said solenoid circuit, and means for causing a flow of electrical energy through said circuits to flash said lamp and actuate said trigger within a predetermined time period following initial flow of energy in said circuits to release said shutter actuating member at substantially the peak of the flash, and means for varying the degree of movement of said shutter actuating member.

SAMUEL MENDELSOHN.